United States Patent
Chou et al.

(10) Patent No.: US 9,686,511 B1
(45) Date of Patent: Jun. 20, 2017

(54) POSITIONING SYSTEM AND METHOD FOR IMAGE CAPTURING DEVICES

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Jin-Jye Chou, New Taipei (TW); Jui-Peng Lin, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/235,115

(22) Filed: Aug. 12, 2016

(30) Foreign Application Priority Data

May 26, 2016 (TW) .............................. 105116538 A

(51) Int. Cl.
H04N 7/15 (2006.01)
H04N 7/14 (2006.01)
H04N 5/232 (2006.01)

(52) U.S. Cl.
CPC ........... *H04N 7/15* (2013.01); *H04N 5/23212* (2013.01); *H04N 5/23296* (2013.01); *H04N 7/142* (2013.01)

(58) Field of Classification Search
None
See application file for complete search history.

(56) References Cited

U.S. PATENT DOCUMENTS

| 2004/0133668 | A1* | 7/2004 | Nicholas, III | H04L 12/5692 709/223 |
| 2009/0059182 | A1* | 3/2009 | Ha | G03B 21/145 353/69 |
| 2014/0378191 | A1* | 12/2014 | Hosoi | H04M 1/03 455/575.1 |
| 2015/0092975 | A1* | 4/2015 | Akino | H04R 1/08 381/355 |
| 2015/0314454 | A1* | 11/2015 | Breazeal | B25J 9/0003 700/259 |

FOREIGN PATENT DOCUMENTS

| CN | 102256098 A | 11/2011 |
| CN | 103235287 A | 8/2013 |

* cited by examiner

*Primary Examiner* — Joseph J Nguyen
(74) *Attorney, Agent, or Firm* — Steven Reiss

(57) ABSTRACT

A positioning system includes an image capturing device and a light-emitting microphone. When the microphone is working, a light emitting portion of the microphone emits light. The image capturing device captures an image of an area to include the light-emitting portion with an unadjusted capturing angle and focal distance and can adjusts the capturing angle and the focal distance to obtain an adjusted image. The light-emitting portion is to be located at a preset coordinated position in the target image before adjustments are made. The image capturing device captures images including a speaker at the microphone, applying an adjusting capturing angle and an adjusted focal distance. A positioning system is also disclosed.

17 Claims, 6 Drawing Sheets

POSITIONING SYSTEM AND METHOD FOR IMAGE CAPTURING DEVICES

CROSS-REFERENCE TO RELATED APPLICATIONS

This application claims priority to Taiwan Patent Application No. 105116538, filed on May 26, 2016, the contents of which are incorporated by reference herein.

FIELD

The subject matter herein generally relates to positioning system and method for image capturing devices.

BACKGROUND

Audio conference systems include a number of image capturing devices and a number of audio tracking devices connected to the image capturing devices. The audio tracking device points to where a speaker is positioned. The image capturing device rotates towards a position of the speaker and captures an image of the speaker. A position of the speaker in the image is various.

BRIEF DESCRIPTION OF THE DRAWINGS

Implementations of the present technology will now be described, by way of example only, with reference to the attached figures.

DETAILED DESCRIPTION

Figure 1:
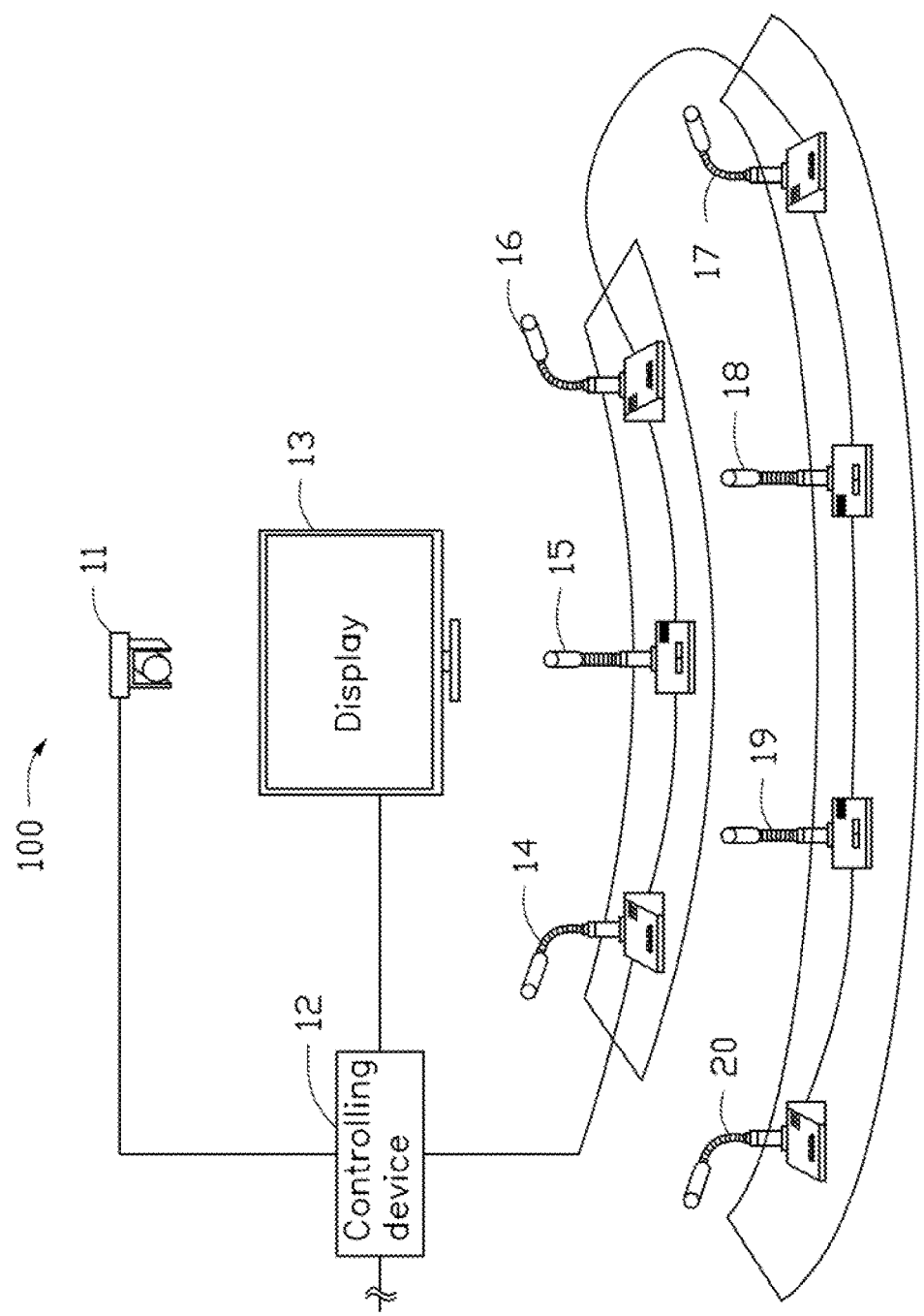
FIG. 1 is a schematic view of a positioning system in accordance with the present application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

A definition that applies throughout this disclosure will now be presented.

The term "comprising" means "including, but not necessarily limited to"; it specifically indicates open-ended inclusion or membership in a so-described combination, group, series, and the like.

The instant disclosure provides a positioning system 100. The positioning system 100 includes an image capturing device 11, a controlling device 12 and a number of microphones 14-20, for example, microphones 14-20.

The controlling device 12 communicates with the image capturing device 11, a display 13, and microphones 14-20. The image capturing device 11 captures images including the microphones. The controlling device 12 receives the images and transmits the images to the display 13 to be displayed. The controlling device 12 further receive audio signals output by the microphones and transmits the audio signals to the display 13. A capturing angle and a focal distance of the image capturing device 11 can be adjusted according to the location of one of the microphones 14-20.

Figure 2:
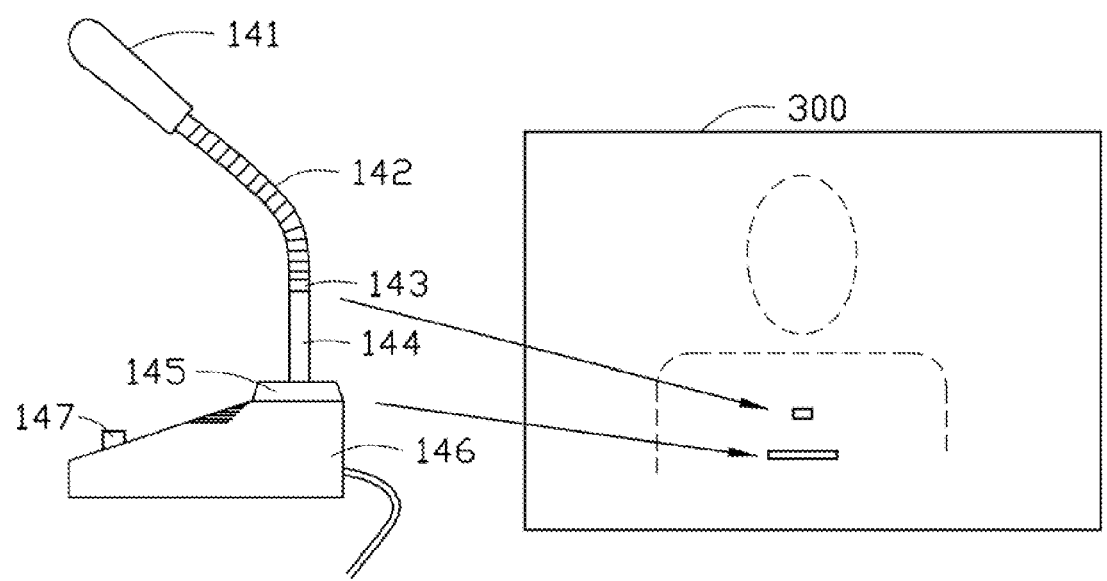
FIG. 2 is a schematic view of a microphone of the positioning system in FIG. 1.

FIG. 2 illustrates the microphone 14 including a first audio portion 141, a first bending portion 142, a first ring light emitting portion 143, a supporting portion 144, a second ring light emitting portion 145, a first pedestal 146, and a first button 147 mounted at the first pedestal 146. The first button 147 controls microphone 14 to turn on or turn off. When microphone 14 turns on, the first ring light emitting portion 143 and the second ring light emitting portion 145 emit light.

The first ring light emitting portion 143 and the second ring light emitting portion 145 are positioned at two ends of the supporting portion 144. The first ring light emitting portion 143 is positioned between the bending portion 142 and the supporting portion 144. The second ring light emitting portion 145 is positioned between the first pedestal 146 and the supporting portion 144. The first audio portion 141 is positioned at an end of the bending portion 142 away from the first ring light emitting portion 143.

In an embodiment, the image capturing device 11 captures a first image of a first target area comprising the microphone 14 and adjusts a first capturing angle and a first focal distance to obtain a first target image 300. When a speaker speaks to the microphone 14, the image capturing device 11 captures a first image of a first target area comprising the microphone 14 and adjusts a first capturing angle and a first focal distance to obtain a first target image 300. In the first target image 300, the first ring light emitting portion 143 and the second ring light emitting portion 145 are to be horizontally located at a middle of the first target image 300 and positioned vertically within a lower third of the first target image 300. As the speaker continues to speak to the microphone 14, the image capturing device 11 captures images with the adjusted first capturing angle and the adjusted first focal distance.

Figure 3:
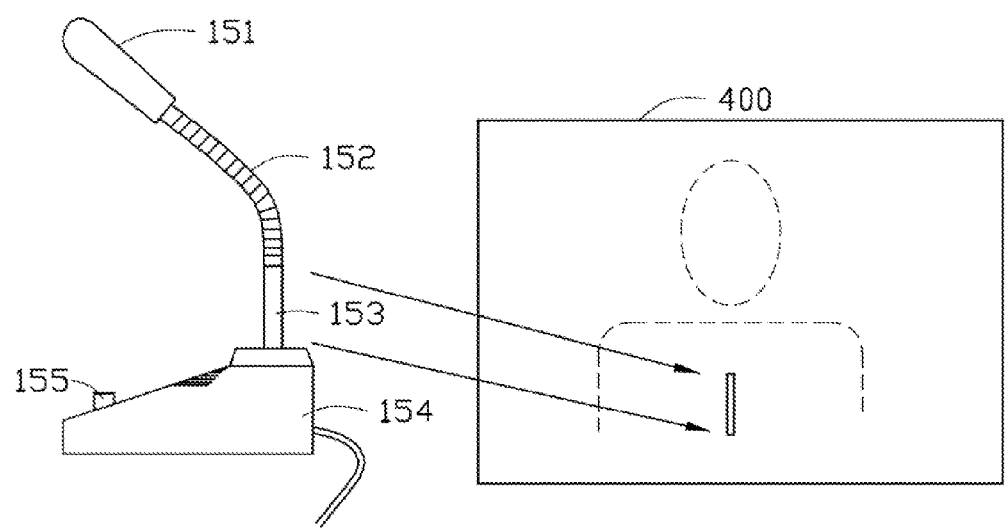
FIG. 3 is a schematic view of another microphone of the positioning system shown in FIG. 1.

FIG. 3 illustrates the microphone 15 including a second audio portion 151, a second bending portion 152, a pillar light emitting portion 153, a second pedestal 154, and a second button 155 mounted at the second pedestal 154. A first end of the pillar light emitting portion 153 perpendicularly connects to the second pedestal 154. A second end of the pillar light emitting portion 153 connects to the second bending portion 152. The second button 155 controls the microphone 15 to turn on or turn off. When the microphone 15 turns on, the pillar light emitting portion 153 emits light.

In an embodiment, the image capturing device 11 captures a second image of a second target area comprising the microphone 15 and adjusts a second capturing angle and a second focal distance to obtain a second target image 400. When a user speaks to the microphone 15, the image capturing device 11 adjusts the second capturing angle and the second focal distance to obtain a second target image 400. In the second target image 400, the pillar light emitting portion 153 is horizontally positioned in the middle of the second target image 400 and positioned vertically at a lower third of the second target image 400. As the speaker continues to speak to the microphone 15, the image capturing device 11 captures images with the adjusted second capturing angle and the adjusted second focal distance.

The image capturing device 11 includes a number of cameras. The cameras can correspond to the microphones 14-20. Each camera captures an image of a target area where one microphone of the microphones 14-20 is positioned. The controlling device 12 can integrate or not integrate the images captured by the cameras to be displayed on the display 13.

The image capturing device 11 further can adjust the image according to features of the speaker. The image capturing device 11 may adjust the image according to the face profile of the speaker.

Figure 4:
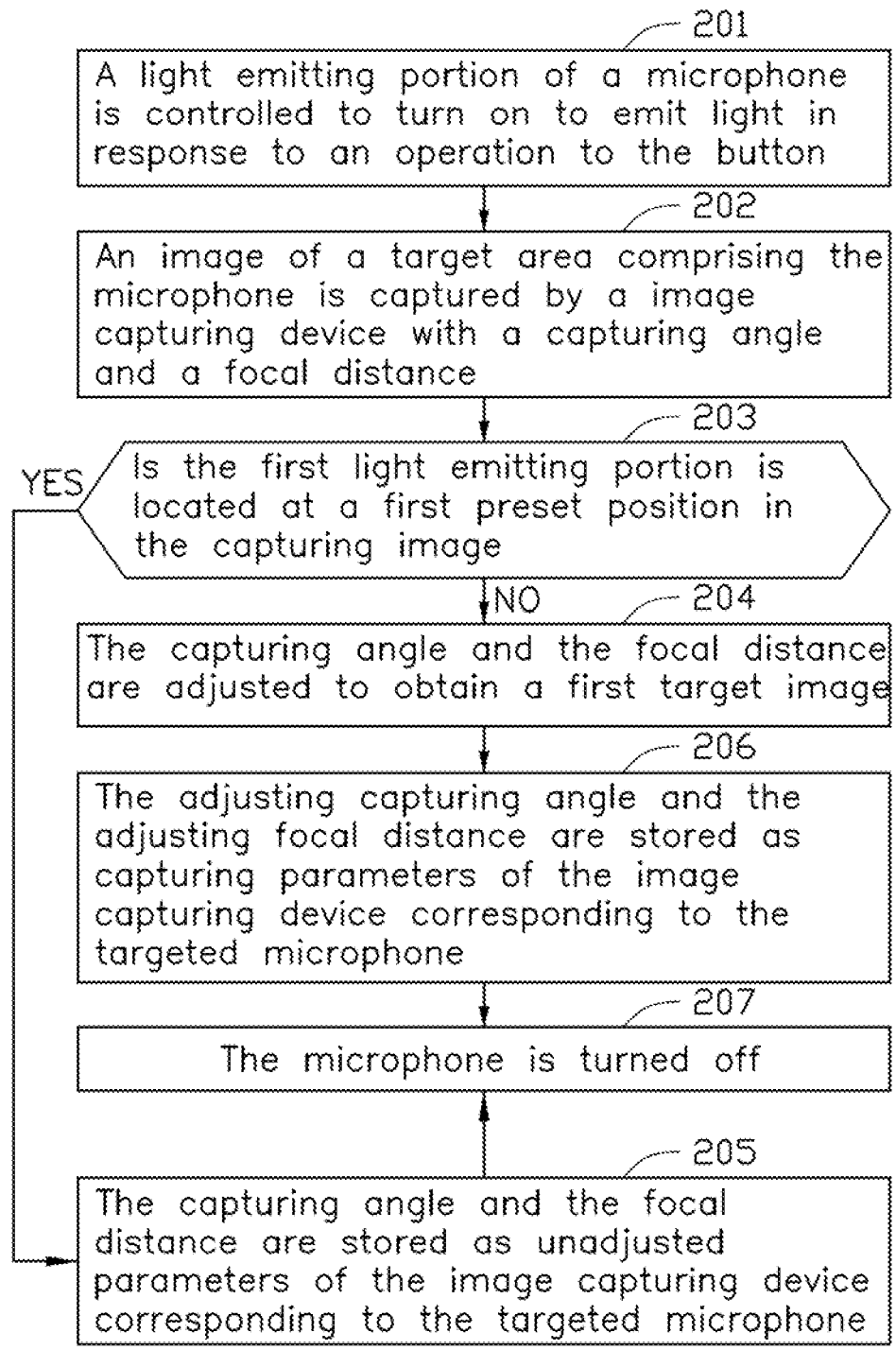
FIG. 4 is a flowchart of a pre-positioning method in accordance with the present application.

FIG. 4 illustrates an image capturing device positioning method according to an embodiment. The method is employed in the positioning system 100. The order of blocks in FIG. 4 is illustrative only and the order of the blocks can change. Additional blocks can be added or fewer blocks may be utilized without departing from this disclosure. The exemplary method begins at block 201.

At block 201, a light emitting portion of a microphone is controlled to turn on to emit light in response to an operation to the button.

At block 202, an image of a target area comprising the microphone is captured by a image capturing device with a capturing angle and a focal distance.

At block 203, a determination is made as to whether the first ring light emitting portion is located at a first preset position in the capturing image. If the first ring light emitting portion is located at a first preset position in the capturing image, the procedure goes to block 205, otherwise the procedure goes to block 204.

At block 204, the capturing angle and the focal distance are adjusted to obtain a first target image. In the first target image, the first ring light emitting portion 143 is located at the first preset position. In an embodiment, in the first target image, the light emitting portion is horizontally positioned at a middle of the target image and vertically positioned within a lower third of the target image.

At block 205, the capturing angle and the focal distance are stored as unadjusted parameters of the image capturing device corresponding to the targeted microphone.

At block 206, the adjusting capturing angle and the adjusting focal distance are stored as capturing parameters of the image capturing device corresponding to the targeted microphone.

At block 207, the microphone is turned off.

Figure 5:
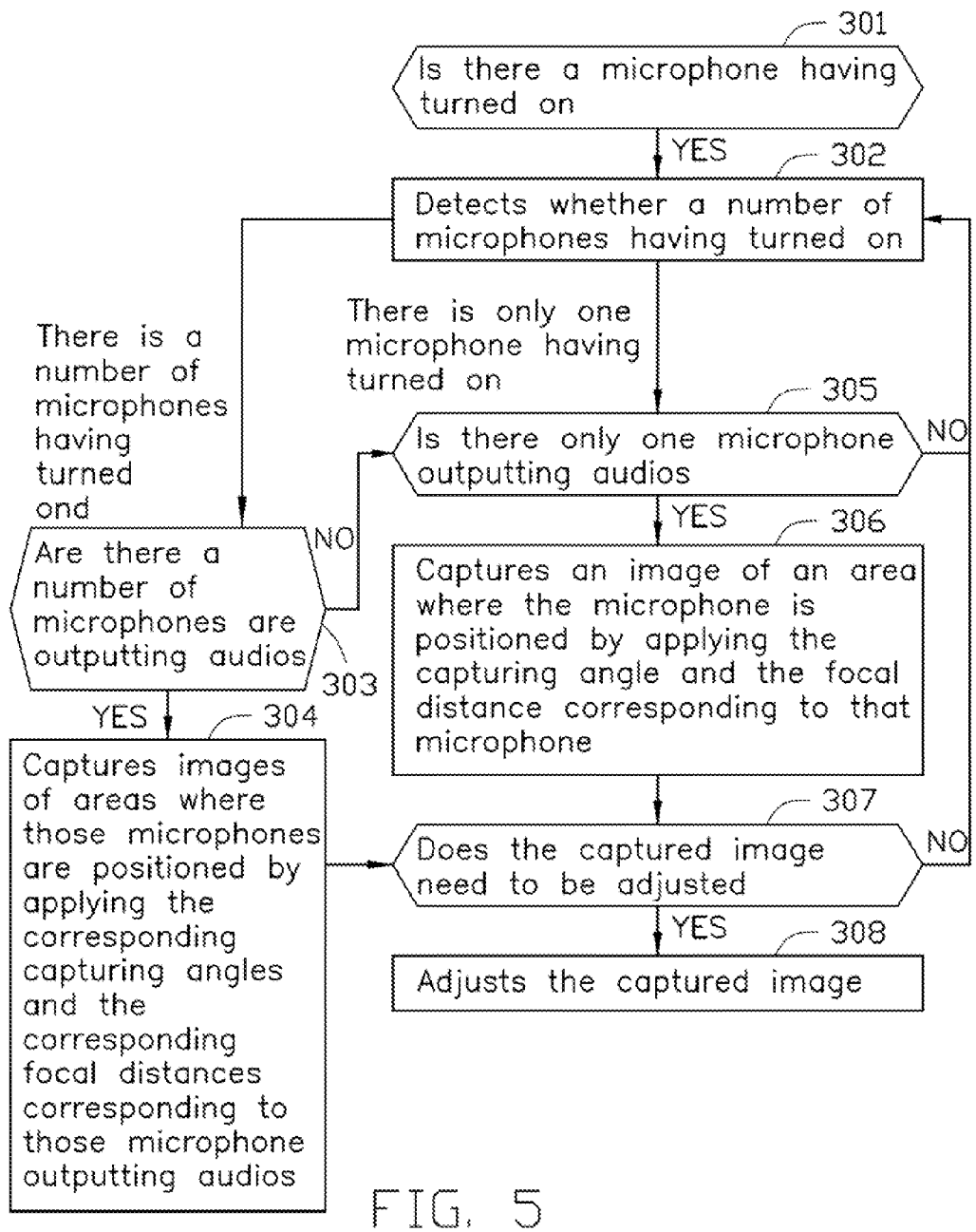
FIG. 5 is another flowchart of a positioning method in accordance with the present application.
Figure 6:
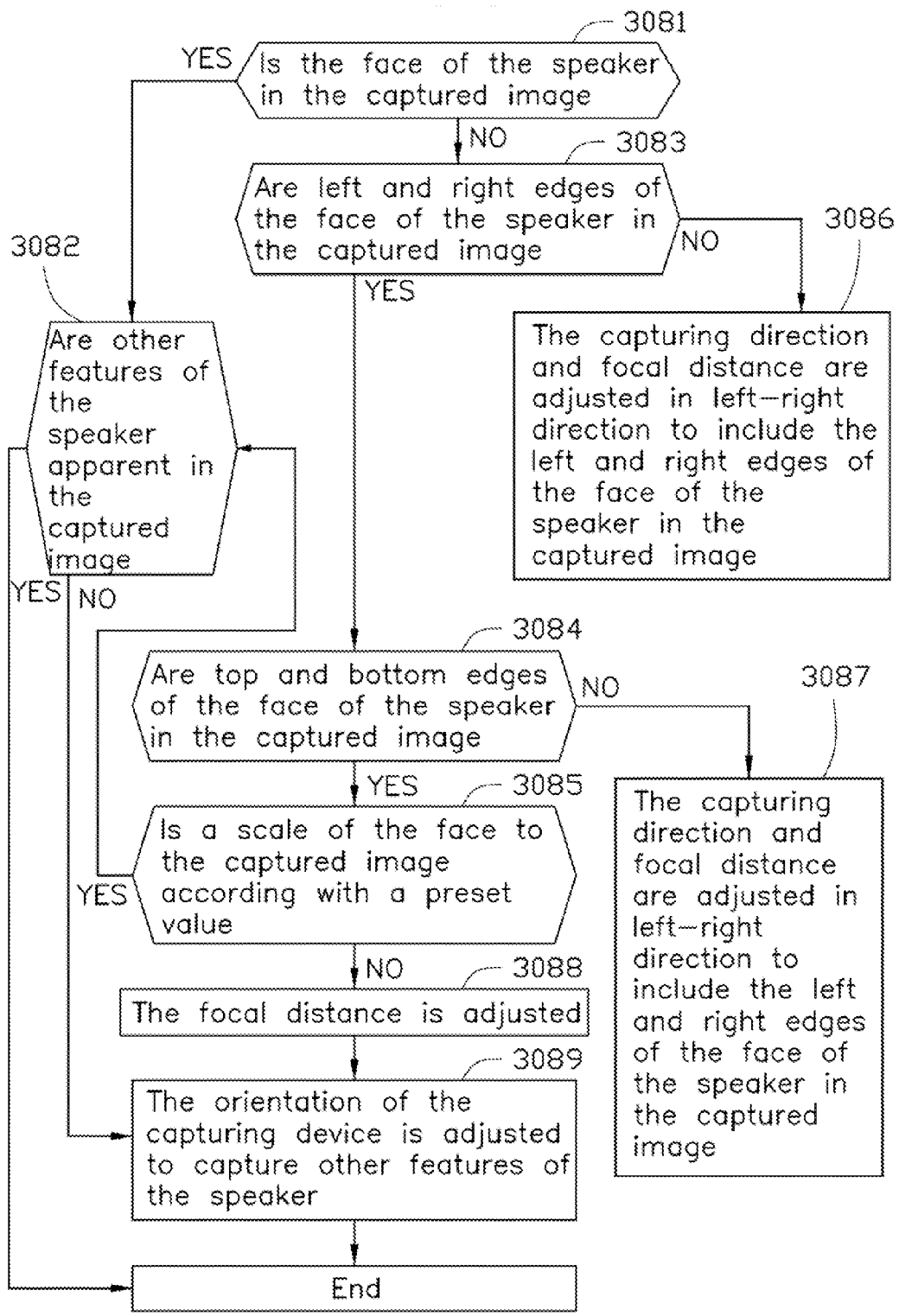
FIG. 6 is a detailed flowchart of block 308 of the positioning method shown in FIG. 5.

FIGS. 5-6 illustrate an image adjusting method according to an embodiment. The method is employed in the positioning system 100. The order of blocks in FIG. 5 is illustrative only and the order of the blocks can change. Additional blocks can be added or fewer blocks may be utilized without departing from this disclosure. The exemplary method begins at block 301.

At block 301, a microphone having turned on is detected. When a microphone is turned on, the procedure goes to block 302. Until a microphone is turned on, the procedure awaits to detect a microphone being turned on.

At block 302, a number of microphones are detected to have turned on. When a number of microphones are turned on, the procedure goes to block 303. If only one microphone is turned on, the procedure goes to block 305.

At block 303, a determination is made as to whether there a number of microphones are outputting audios. If a number of microphones are outputting audios, the procedure goes to block 304. Otherwise, the procedure goes to block 305 when audio output is detected from only one microphone.

At block 304, the image capturing device 11 captures images of areas where those microphones are positioned by applying the corresponding capturing angles and the corresponding focal distances corresponding to those microphone outputting audios.

At block 305, a determination is made that there is only one microphone outputting audios. If there is only one microphone outputting audios, the procedure goes to block 306. Otherwise, the procedure goes to block 302.

At block 306, the image capturing device 11 captures an image of an area where the microphone is positioned by applying the capturing angle and the focal distance corresponding to that microphone.

At block 307, a determination is made as to whether the captured image needs to be adjusted. If the captured image needs to be adjusted, the procedure goes to block 308. Otherwise the procedure goes to block 302.

At block 308, the captured image is adjusted.

Block 308 includes the following blocks;

At block 3081, a determination is made as to whether there is the face of a speaker in the captured image. If the face of a speaker is in the captured image, the procedure goes to block 3082. Otherwise the procedure goes to block 3083.

At block 3082, a determination is made as to whether other features of the speaker are apparent in the captured image. If other features of the speaker appear in the captured image, the procedure ends. If no other features of the speaker are apparent in the captured image, the procedure goes to block 3089.

At block 3083, a determination is made as to whether left and right edges of the face of the speaker are in the captured image. If the left and right edges of the face of the speaker are showing in the captured image, the procedure goes to block 3084. Otherwise the procedure goes to block 3086.

At block 3084, a determination is made as to whether top and bottom edges of the face of the speaker is in the captured image. If the top and bottom edges of the face of the speaker is in the captured image, the procedure goes to block 3085. Otherwise the procedure goes to block 3087.

At block 3085, a determination is made as to whether a scale of the face to the captured image is according to a preset value. If the scale of the face in the captured image is according to the preset value, the procedure goes to block 3082. Otherwise the procedure goes to block 3088.

At block 3086, the capturing direction and focal distance are adjusted in left-right direction to include the left and right edges of the face of the speaker in the captured image.

At block 3087, the capturing direction and focal distance are adjusted in top-bottom or up-down direction to include the top and bottom edges of the face of the speaker in the captured image.

At block 3088, the focal distance is adjusted.

At block 3089, the orientation of the capturing device is adjusted to capture other features of the speaker.

The embodiments shown and described above are only examples. Even though numerous statistics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims.

What is claimed is:

1. A positioning system comprising: a first microphone, further comprising a first ring light emitting portion and a first button, the first button controlling the first ring light emitting portion to emit light in response to an operation for the first button; an image capturing device, capturing a first image of a first target area comprising the first microphone with a first capturing angle and a first focal distance and adjusting the first capturing angle and the first focal distance to obtain a first target image, wherein the first ring light emitting portion is located at a first preset position in the first target image; and a controlling device, communicating with a display and the image capturing device, wherein the controlling device receives the first target image and transmits the first target image to the display to be displayed.

2. The positioning system as claimed in claim 1, wherein the first ring light emitting portion is horizontally positioned at a middle of the target image and is vertically positioned within a lower third of the target image.

3. The positioning system as claimed in claim 1, wherein the microphone comprises a pedestal, the button is mounted at the pedestal.

4. The positioning system as claimed in claim 3, wherein the microphone comprises a supporting portion, the first ring light emitting portion is positioned between the pedestal and the supporting portion.

5. The positioning system as claimed in claim 3, wherein the microphone comprises a supporting portion and a bending portion, the supporting portion is positioned between the pedestal and the bending portion, and the first ring light emitting portion is positioned between the supporting portion and the bending portion.

6. The positioning system as claimed in claim 1, wherein the first ring light emitting portion is ring-shaped.

7. The positioning system as claimed in claim 1, wherein the first ring light emitting portion is pillared.

8. The positioning system as claimed in claim 1, further comprising: a second microphone, further comprising a second light emitting portion and a second button, wherein the second button controls the second light emitting portion to emit light in response to an operation for the second button; wherein the image capturing device captures a second image of a second target area comprising the second microphone with a second capturing angle and a second focal distance and adjusts the second capturing angle and the second focal distance to obtain a second target image, the second light emitting portion is located at a second preset position in the second target image, and the controlling device receives the second target image and transmits the second target image to the display to be displayed.

9. The positioning system as claimed in claim 8, wherein the first preset position is identical to the second preset position.

10. The positioning system as claimed in claim 8, wherein the image capturing device comprises two cameras for capturing the first image and the second image.

11. A positioning system comprising:
a first microphone comprising a first ring light emitting portion to emit light, when the microphone is working, the first ring light emitting portion emits light;
an image capturing device for capturing a first image of a first target area comprising the first ring light emitting portion with a first capturing angle and a first focal distance and adjusting the first capturing angle and the first focal distance to obtain a first target image, wherein the first ring light emitting portion is located at a first preset position in the first target image, wherein the image capturing device captures an image comprising a speaker in front of the first microphone with the adjusted first capturing angle and the adjusted first focal distance; and
a controlling device, communicating with a display and the image capturing device, wherein the controlling device receives the first target image and transmits the first target image to the display to be displayed.

12. The positioning system as claimed in claim 11, wherein the first ring light emitting portion is horizontally positioned at a middle of the target image and is vertically positioned within a lower third of the target image.

13. The positioning system as claimed in claim 11, wherein the microphone comprises a pedestal, the button is mounted at the pedestal.

14. The positioning system as claimed in claim 13, wherein the microphone comprises a supporting portion, the first ring light emitting portion is positioned between the pedestal and the supporting portion.

15. The positioning system as claimed in claim 13, wherein the microphone comprises a supporting portion and a bending portion, the supporting portion is positioned between the pedestal and the bending portion, and the first ring light emitting portion is positioned between the supporting portion and the bending portion.

16. The positioning system as claimed in claim 11, wherein the first ring light emitting portion is ring-shaped.

17. The positioning system as claimed in claim 11, wherein the first ring light emitting portion is pillared.

* * * * *